April 18, 1933. W. G. BOND 1,904,197
CORK MANUFACTURE
Filed May 20, 1926 3 Sheets-Sheet 2
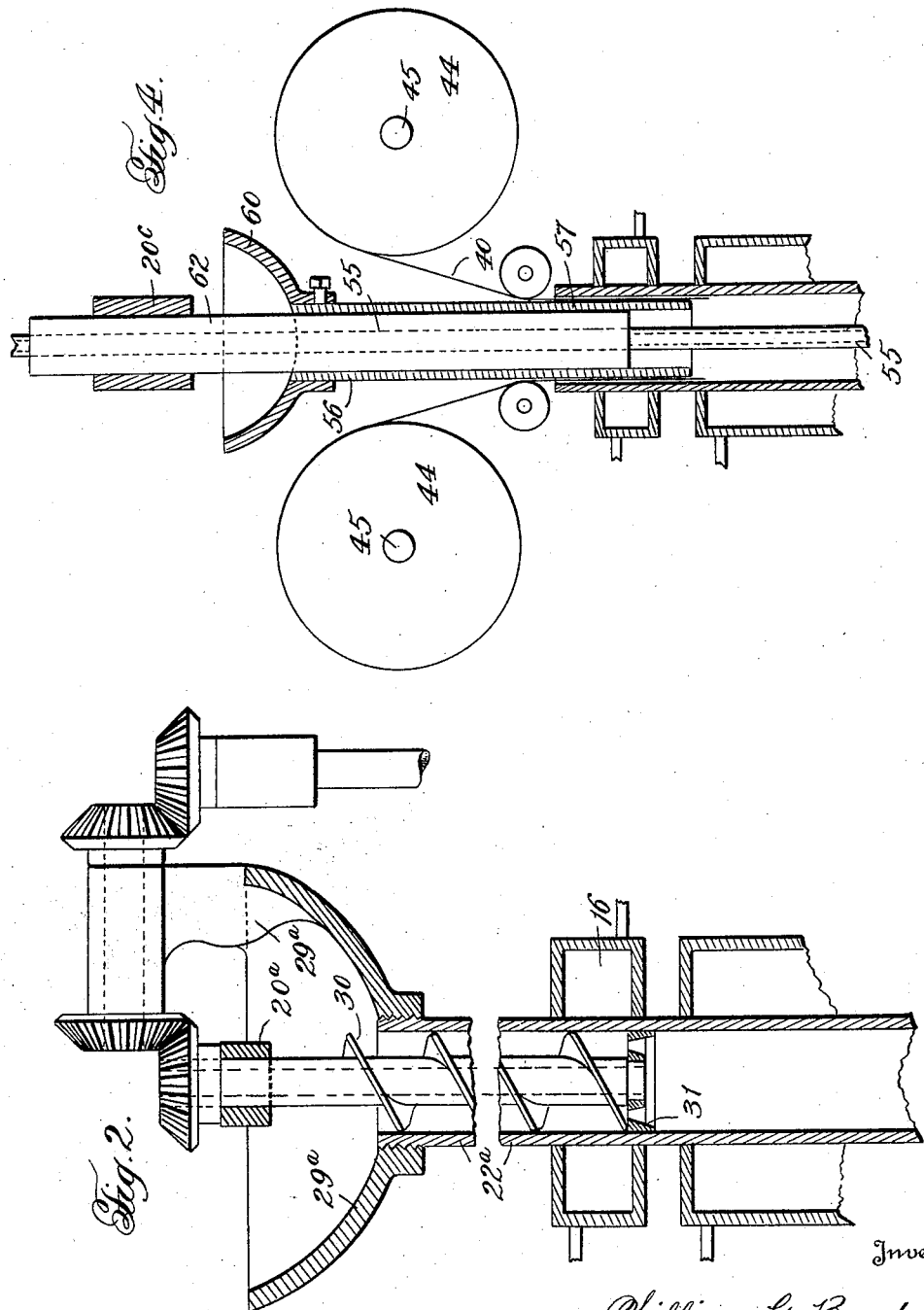

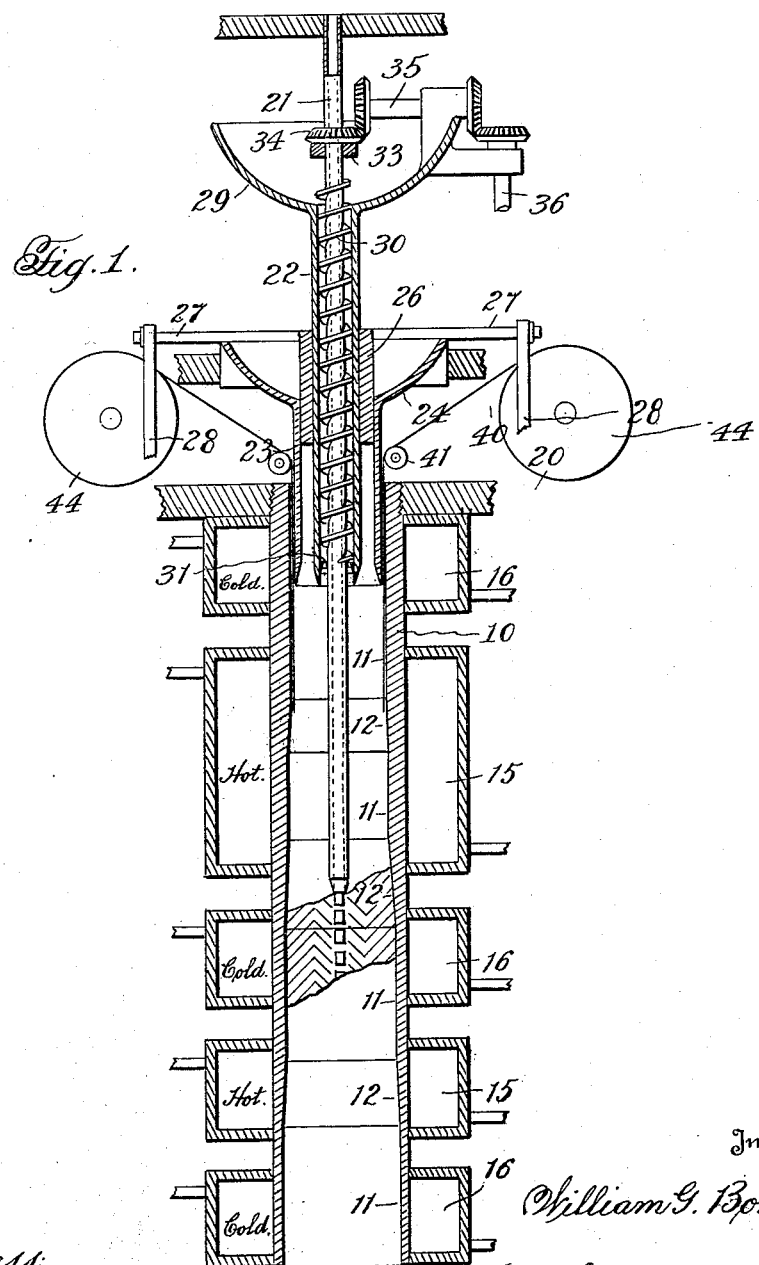

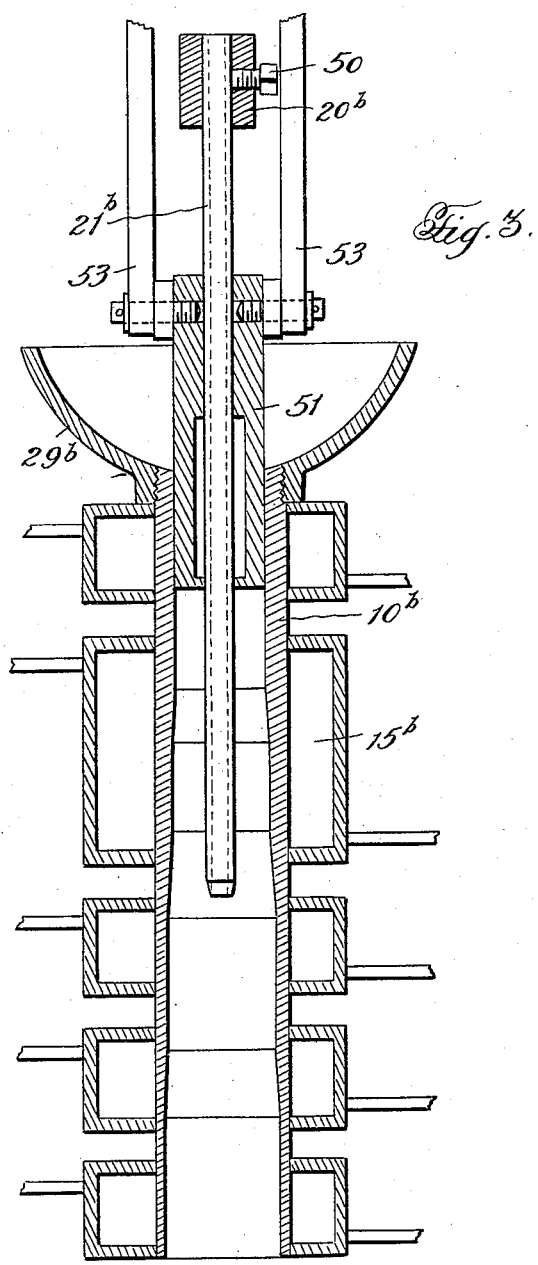

Patented Apr. 18, 1933

1,904,197

UNITED STATES PATENT OFFICE

WILLIAM G. BOND, OF WILMINGTON, DELAWARE

CORK MANUFACTURE

Application filed May 20, 1926. Serial No. 110,521.

This invention relates to the manufacture of articles from cork or similar particles impregnated with a binder which sets under heat, and has for its principal object the extension of the field of usefulness of machines and processes of that nature to render it possible to produce by them materials of widely different sorts.

A further object of the present invention is to provide a machine capable of making articles having a plurality of different grades of comminuted material both with and without a core of different material.

The use of extruded cork, altho quite extensive, is very slight compared to the possibilities of the material and many things now made of more expensive material could readily be made of cork and in other cases where cork might be more expensive than the material now used the present invention will produce a material which would be so far superior that the greater cost will not be an appreciable factor. One typical example is found in lead pencils which are universally made of two pieces of wood grooved and glued together with a small stick of graphite material between them. It has heretofore been impossible to make a pencil of cork by the extrusion process owing to the brittleness of the lead altho the advantage of the cork for the purpose is well known. With the machine here illustrated pencils can be readily extruded with no danger at all from breaking of the leads and the leads may be fed to the machine in sticks of the proper length alternately with slugs of cork so that the extruded rod may be cut in sections ready for use or ready to receive an eraser.

In the drawings:—

Figure 1 is a cross section of a forming tube and associated mechanism for carrying out the process.

Figure 2 is a simpler machine particularly suited to the making of cylindrical objects of a single material and with an optional central rod or tube.

Figure 3 shows a modification suitable for making pencils of a single material plus the graphite.

Figure 4 shows a machine suitable for making slabs or other shaped articles, with or without a core; for example, asbestos shingles with copper facing could readily be made by this machine. The framework of the various machines is not shown in the drawings as it may be of any desired configuration preferably however along the general lines shown in my Patent No. 1,453,617 with horizontal tubes or in my pending application Serial No. 32,207 filed May 22, 1925, which has become Patent 1,716,293, with vertical forming tubes.

The forming tube 10, of which only one is shown in any of the figures, may be cylindrical in internal bore where strength of the finished article is required but is gradually tapered as shown in Figure 1 in case the material is intended to be soft and light as in pencils, insulation and so forth. The several cylindrical portions 11 are interrupted by the conical tapered portion 12, arranged so that the diameter of the bore is approximately proportionate to the penetration of the coagulating action.

The hot chambers 15 and the cold chambers 16 may follow ordinary practice save that usually I prefer to have the initial and final zones each cold and to have the second zone a hot zone of greater axial length than any of the other chambers. The temperature of the hot zone next to the exit cold zone is naturally less than the temperature of the large hot zone. These hot and cold chambers 15 and 16 are secured to the forming tube 10 and the latter is supported by the frame 20 which also supports the central sleeve 21, the intermediate sleeve 22 and the outer sleeve 23 and the parts secured thereto.

The outer sleeve 23 carries a hopper 24 at its top and between this sleeve and the intermediate sleeve 22 there is a hollow cylindrical plunger 26 secured to cross bars 27 which receive motion from the vertically reciprocating rods 28. The intermediate sleeve 22 also has a hopper 29 from which cork or other material is delivered thru the screw conveyer 30 which is hollow to receive within its central bore the central sleeve 21. The screw is guided in its stationary breaker plate 31 and in a collar 33 (fast to the frame) which supports the beveled gear 34 receiving its power thru the shafts 35 and 36 or in any other desired manner. The two separate materials, it will be noted, are fed in different manners in Figure 1, the inner material being fed under constant pressure by the screw while the outer material is fed by increments by means of the plunger 26 which may feed at just the same rate as the screw but may and preferably does feed at a speed greater or less than that of the screw. The pressures likewise may be the same or different but the screw pressure will always be constant while a plunger pressure never can.

In operation solid objects are fed thru the central sleeve 21, preferably alternately with blocks of cork of the same cross section as the solid articles. These solid objects may for example be bushings for the making of wheels or casters in which case it will be usual to feed material of one kind directly in contact with the bushing and to feed a more expensive material for example such as soft cork for the tread in contact with the first material and in contact with the outer wall of the forming tube. If the articles fed thru the sleeve 21 are relatively fragile it is best to have the sleeve 21 as shown in full lines altho if the articles fed thru the sleeve are relatively sturdy the sleeve 21 may be of much shorter length extending only to the bottom of the cold chamber or approximately that distance. The hoppers 29 and 24 are filled with two different comminuted materials, for example, cork in one and sawdust in the other, each mixed in the usual way with a chosen heat coagulating binder, the one being fed by the screw 30 and the other by the plunger 26. The two materials will fuse as they pass the bottom of the intermediate sleeve 22 and as they pass still further will grip the article fed thru the central sleeve 21 making a firm attachment to it and also to the material 40 fed between the outer sleeve 23 and the forming tube 10, this material being guided by rolls 41 of shape to match the shape of the outer sleeve 23 which is not necessarily cylindrical. The material 40 may be paper, cloth, wire cloth, sheet metal or any other suitable material and may be on one face only of the finished product or may completely encircle it, a number of rolls 44 being required however if the extruded rod is to be entirely enclosed. The material fed thru the central sleeve 21 may be large or small compared to the thickness of the cork or sawdust and is not necessarily cylindrical altho the intermediate sleeve 22 must be cylindrical owing to the use of the screw feed. If it is necessary to have the interior coagulated material non-cylindrical it will be necessary to replace the screw by a second plunger.

In Figure 2 the device shown is a simple one for forming an article with one kind of material, as for example, cork, and having a central rod or tube. In this figure the sleeve 22a is actually the forming tube and it is carried by the frame 20a having a hopper extension 29a to which the sleeve or tube 22a is threaded. The breaker plate 31 is fast to the sleeve or tube 22a and guides the screw 30, the stem of which is preferably hollow so that a rod or tube may be fed centrally down thru the screw. The breaker plate 31 is perforated as in a food chopper and prevents the stratifying of the fed material. This breaker plate is preferably located just beneath the bottom of the initial cold chamber 16. The rods or tubes may be of any desired length, for example, in the making of wheel stock the material fed thru the center of the screw 30 would be short annular tubes or cylinders which would form the bushings of the finished wheels when they were cut from the wheel stock. It is likewise immaterial whether the material fed thru the center of the tube 21 are continuous pieces, moderately sized pieces or short sections.

In Figure 3 I have shown a form quite convenient for making lead pencils. In this figure the hopper 29b is fast to the forming tube 10b and supports it, the hopper being fast to the frame of the machine which also supports the central sleeve 21b which is made as thin as possible, but is sufficiently strong to avoid lateral stress on the graphite stick fed thru it. This sleeve 21b is movable vertically with respect to the frame 20b but may be held in desired adjusted position by means of a set screw 50. The plunger 51 is connected for reciprocating movement by means of the twin rods 53 preferably not pitmen. As will be noted, the sleeve 21 extends somewhat below the hot chamber 15b so that the cork or other material has appreciably set before being brought into contact with the lead. The expansion of the material is ample at this stage to make a sufficiently firm grip upon the graphite. In using this machine I feed in the sticks of graphite of the proper length to make a pencil and alternately between these sticks I place tiny cylinders of cork of approximately the same length as the thickness of the cork around the lead and naturally of the same diameter as the graphite stick itself. Consequently when the rod is extruded it may be sheared just to one side of the small cylindrical cork insert and the pencil will then be ready for use with the lead hidden on the butt end but exposed on the end to be pointed.

In Figure 4 I have shown a very simple device for utilizing the covering material 40. In this view I have shown two rolls 44 each mounted on an axis 45 and covering the two flat sides of a slab relatively thin compared to its width and length, the cover material 40 being on one or both of the flat sides. The central member 55 may be of any shape, cylindrical if the sleeve 56 and forming tube 57 are cylindrical, but being a thin partition wall in case, as preferred, the forming tube 57 is of shape to make such articles as a shingle. In the latter case the asbestos or other comminuted material is placed on the hopper 60 and the material 40 is, for example, thin copper. The plunger 62 guided in the machine framework 20c forces the material and the particles thru the forming tube 57 and by frictional engagement also feeds the sheet material 40 which preferably is treated with paraffin or with the binder in order to reduce friction. If a partition is used the slabs are produced two at a time, each covered on one flat side only.

In case the sleeves 23 and 22 are each cylindrical it is at times advantageous to use two screws in place of the plunger and screw shown, but the construction of Figure 1 is required when the cross section of the article is non-circular.

What I claim is:—

1. The process of making articles which consists in feeding an annular mass of comminuted particles and a heat coagulating binder thru a forming tube past alternate hot and cold zones and in simultaneously passing thru the center of the mass a plurality of rods of different material, allowing the coagulating mass to expand and grip said rods and thereby form the sole translating means for said rods.

2. The process of making articles which consists in feeding an annular mass of comminuted particles and a heat coagulating binder thru a forming tube past alternate hot and cold zones and in passing thru the center of the mass a second annular mass of particles and binder and having a rod of different material positioned therein, causing the second mass to fuse with the first mass during coagulation, laterally expanding the two moving masses to grip and carry the rod, controlling the pressure of one of said masses by feeding with successively applied impulses and incremental additions.

3. The method of making wheel stock which consists in feeding bushings centrally thru a forming tube having alternate hot and cold zones, feeding comminuted particles of one material with a heat coagulating binder, around said bushings, and in substantially simultaneously feeding comminuted particles of a different material around the first material and in contact with the walls of said forming tube.

4. The method of extruding cork articles which consists in separately but simultaneously feeding particles of cork and another material both with a suitable heat coagulating binder into a forming tube having alternate hot and cold zones, simultaneously bringing together the approximate surfaces of the two masses and forcing them thru the said tube, one of said materials being fed at a greater rate than the other.

5. The method of extruding cork articles which consists in simultaneously forcing particles of cork and another material both with a suitable heat coagulating binder thru a forming tube having alternate hot and cold zones, one of said materials being forced at a greater pressure than the other material.

6. In a device of the character described, a forming tube having alternate cold and hot zones, a plurality of concentric sleeves within said tube and means for feeding material thru the sleeves to the tubes the central sleeve extending further into the tube than the other sleeve.

7. The process of extruding with a core which consists in forcing comminuted particles and a heat setting binder thru a forming tube past alternating hot and cold zones and feeding the core by the expansion of the particles after partial setting of the binder.

8. The process of extruding an article with a core which consists in passing comminuted particles and a heat setting binder and a core thru alternate cold and hot zones and in shielding said core from the particles until the binder has partially set.

9. The process of forming a pencil which consists in passing comminuted particles and a heat setting binder thru a forming tube past alternate cooling and heating zones, in passing sticks of graphite thru the center of the mass of particles and binder, and in shielding the graphite sticks from direct contact with the particles until the particles have passed the binder setting heating zone.

10. The method of making composite stock which consists in feeding comminuted particles of one material combined with a heat coagulating binder thru a forming tube having alternate hot and cold zones, and in substantially simultaneously feeding comminuted particles of a different material together with a suitable binder, around the first material and in contact with the walls of the forming tube while partly controlling the pressures on the two materials by feeding the two materials at different rates.

11. The method of making composite stock which consists in feeding comminuted particles of one material combined with a heat coagulating binder thru a forming tube having alternate hot and cold zones, and in substantially simultaneously feeding comminuted particles of a different material together with a suitable binder, around the first material and in contact with the walls of the forming tube, one of the materials being fed by constant pressure and the other material being fed by intermittently applied pressure.

In testimony whereof I affix my signature.

WILLIAM G. BOND.